United States Patent [19]

Jennings et al.

[11] Patent Number: 5,760,508
[45] Date of Patent: Jun. 2, 1998

[54] ENERGY STORAGE AND CONVERSION DEVICES

[75] Inventors: Howard Timothy Jennings; Terrence Martin Cox, both of Chesire, United Kingdom

[73] Assignee: British Nuclear Fuels PLC, United Kingdom

[21] Appl. No.: 920,873

[22] Filed: Aug. 29, 1997

Related U.S. Application Data

[63] Continuation of Ser. No. 583,131, Mar. 18, 1996, abandoned.

[30] Foreign Application Priority Data

Jul. 6, 1993 [GB] United Kingdom ............... 9313926

[51] Int. Cl.$^6$ ............................................... H02K 7/02
[52] U.S. Cl. .................... 310/74; 310/90; 310/90.5; 310/153; 74/572
[58] Field of Search ................... 310/90.5, 90, 74, 310/750; 318/140

[56] References Cited

U.S. PATENT DOCUMENTS

| | | | |
|---|---|---|---|
| 3,868,520 | 2/1975 | Curtris et al. | 310/61 |
| 4,150,582 | 4/1979 | Brobeck . | |
| 4,444,444 | 4/1984 | Benedetti et al. . | |
| 4,631,456 | 12/1986 | Drescher et al. | 318/140 |
| 4,700,094 | 10/1987 | Downer et al. | 310/90.5 |
| 4,870,310 | 9/1989 | Triplett | 310/74 |
| 5,124,605 | 6/1992 | Bitterly et al. | 310/74 |

FOREIGN PATENT DOCUMENTS

| | | | |
|---|---|---|---|
| 2204916 | 10/1973 | France | H02K 7/14 |
| 2631341A | 5/1980 | U.S.S.R. . | |

OTHER PUBLICATIONS

Derwent Abstract Livshits et al 80-H5419c/35 (SU 2631341).
Proceedings of the 26th Intersociety Energy Conversion Engineerigh Conference, vol. 4, Aug. 4-9, 1991.

Primary Examiner—Steven L. Stephan
Assistant Examiner—Timothy A. Williams
Attorney, Agent, or Firm—Nixon & Vanderhye

[57] ABSTRACT

An energy conversion and storage device (1) which comprises a magnetic rotor (5) and a stator (7) comprising one or more electric coils whereby electrical energy may be applied to and extracted from the device (1) when the rotor (5) is rotating relative to the stator (7) and means (13, 14, 15, 17) for electromagnetically suspending the rotor (5) whilst rotating relative to the stator (7), wherein the rotor (5) comprises a tubular body portion formed of a composite of fiber reinforced material and magnetic material emnbedded within the fiber reinforced material and the stator (7) is disposed inside the rotor (5) co-axially with the rotor (5) and extends along at least a major part of the length of the said body portion of the rotor (5).

18 Claims, 2 Drawing Sheets

ENERGY STORAGE AND CONVERSION DEVICES

This is a rule 62 file wrapper continuation of application Ser. No. 08/583,131 filed Mar. 18, 1998, now abandoned.

The present invention relates to energy storage and conversion devices.

Flywheels are well known devices which can receive and store energy as kinetic energy and can release energy for conversion into other forms when required by a user system. In the prior art a number of flywheel systems are known in which the flywheel comprises a rotor in an electric motor/generator system. Examples of such systems are described in prior patent specifications EP0191225B, FR2614367 and U.S. Ser. No. 124605. In such systems the means employed for constructing the rotor, mutually arranging the rotor to rotate relative to the stator of the motor/generator and suspending the rotor, when rotating, relative to the szator are not ideal.

According to the present invention there is provided an energy conversion and storage device which comprises a magnetic rotor and a stator comprising one or more electric coils whereby electrical energy may be applied to and extracted from the device when the rotor is rotating relative to the stator and means for electromagnetically suspending the rotor whilst rotating relative to the stator, wherein the rotor comprises a body portion formed of a composite of fiber reinforced material and the stator is disposed inside the rotor co-axially with the rotor; characterised in that the body portion of the rotor is tubular and has a length along its axis which is greater than its widest diameter; magnetic material is embedded within the fiber reinforced material of the body portion of the rotor; and the stator extends along at least a major part of the length of the said body portion of the rotor.

Preferably the length of the body portion desirably faces the stator over at least 90 per cent of the length of the stator.

The body portion of the rotor may be formed in the manner described in Applicant's copending patent application WO 94/06193 entitled 'A Fiber-Reinforced Rotor' wherein magnetic material is disposed within and between layers of reinforcing fibers in fiberd reinforced plastics material. As described in the said Application, the magnetic material is desirably a material which can be obtained in powder form and which can be magnetised by high magnetic fields, eg hard magnetic materials. Desirably, the magnetic material is resistant to demagnetising forces. The magnetic material may be a rare earth doped magnetic material, eg cobalt-samarium or neodymium-boron. The fiber reinforced material may comprise a known fiber reinforced polymeric material the polymeric matrix of which may be a cold setting, thermosetting or thermoplastic material or a mixture of these. The polymeric material may comprise one or more of epoxy resins, polyester resins, Friedel Crafts resins, polyimides, polyether sulphones, and polyether ketones (PEEK) optionally together with known additives such as hardeners, fillers, anti-oxidants and the like. The reinforcing fibers may comprise one or more of carbon, glass, boron, polyamide, polyaramid and polyolefin fibers.

The loading of the magnetic material within the fiber reinforced material may, as described in copending UK Patent Application 9313943.4 by the present Applicant, vary throughout the matrix of the fiber reinforced material whereby the average mass per unit volume of the rotor body portion decreases radially with distance from the axis of the structure.

As described in WO 94/06193, the rotor body portion preferably comprises an initial layer of windings of fibers, at least one intermediate layer of windings of fibers superimposed about the initial layer define helical spaces therebetween, magnetic filler material in the spaces, and an outer layer of windings of fibers superimposed about the intermediate layer(s).

Such a rotor may be manufactured by a method including the steps of:

a) winding onto a mandrel an initial layer comprising fibers by a thermosetting resin;

b) winding at least one intermediate layer comprising resin-impregnated fibers about the initial layer so as to define spaces between the fibers of the intermediate layer;

c) disposing a mixture comprising unmagnetised magnetic filler material and a resin matrix material in the spaces;

d) winding an outer layer comprising uncured resin-impregnated fibers about the intermediate layer;

e) applying a magnetic field to align the magnetic material in a reauired orientation whilst the resin is in the liquid state prior to gelling and during the gelling process;

f) curing the resin, and h) magnetising the magnetic filler material with an electric coil.

The stator in the device according to the present invention may be formed using a substrate comprising a die cast or sintered or extruded or moulded tube or cylinder. The substrate may comprise ironless metallic or polymeric material. The substrate may contain no magnetic material or alternatively may comprise non-magnetic material coated with powdered iron-containing or other magnetic material or laminate structure comprising alternate layers which incorporate magnetic and non-magnetic materials. The electric coil(s) may be applied to the substrate during the manufacture of the substrate or afterwards. The electric coil(s) may be formed on the substrate by any suitable known technique such as welding, chemical bonding or by deposition by printing eg using photolithographic techniques. The coil(s) may be printed for example using copper.

Desirably, the coils of the stator are able to accept very high currents. Avoidance of iron in the stator may assist in such acceptance. However, ironless stators are inefficient. The stator may have means associated therewith by which iron, eg particles, suspended in a pumpable fluid, eg an inert oil, may be injected into or removed from a cavity within the stator whereby the permeability of the stator may be varied according to the required state of energisation of the device.

The rotor and stator in the device according to the present invention are desirably contained in an enclosure defining a chamber which may be evacuated preferably to a high vacuum state, eg 10–6 Torr, during use to minimise molecular drag upon the rotor and the parasitic energy losses produced thereby. The chamber may include an arrangement by which residual molecules may be accelerated toward and through a semi-permeable membrane and trapped in a region of the chamber behind the membrane to assist develop and maintain the vacuum. The membrane may comprise a microporous material which allows gas molecules eg $O_2$, $N_2$ and $CO_2$ through at high speed but does not allow back transmission at low speeds.

The semi-permeable membrane may be provided in the space between the rotor and the enclosure inner wall. Such a membrane may be penetrated in use by residual gas molecules projected toward the membrane by the rotary action of the rotor and thereafter trapped in the region between the membrane and the enclosure inner wall. The membrane may conveniently be corrugated to increase the probability of molecules being projected through the membrane.

The device according to the present invention may include a hollow conduit through which coolant fluid may be passed to remove heat generated during use. The conduit may comprise a hollow shaft located substantially on the axis of the stator and may extend between the respective facing end walls of the enclosure. The coolant may comprise water, air, alcohol or another suitable medium which may be pumped through the hollow conduit.

The said enclosure may be a casing, eg 5 mm to 50 mm thick, formed using high strength aluminium or an alloy thereof optionally reinforced with fiber over-windings eg of polyaramid. The inner wall of the enclosure may comprise means to arrest the material of the rotor in the event that the rotor crashes into the enclosure following malfunction during use. The said casing inner walls may carry skid rings or may contain a charge of a material which absorbs kinetic energy by changing its state, eg a liquid such as water which is vaporised, or a solid such as vermiculite.

In order to detect an impending failure of the rotor in the device according to the present invention the device may include means for monitoring the temperature in the said chamber or of the rotor and/or by monitoring the stress patterns developed in the body of the rotor. Fiber-optic guides may be used in a known way to monitor remotely temperatures or stress patterns of the rotor. Where the detected temperature or detected stress level is unacceptably high the input electrical energy may be automatically shut-off whereby the speed of the rotor is allowed to fall to an acceptable level.

The rotor may include embedded therein one or more fiber optic light guides and light signals may be passed through the guide(s) from a light source, eg semiconductor laser communicating with the guide, and detected at the other end by a photodetector, eg photodiode, the source and detector being statically positioned outside the rotor. Differences in length of the fiber caused by raised temperatures and/or stresses within the rotor may be detected by timing the light travelling along the guide or by measuring changes in its dispersion or absorption caused by changes in properties eg. refractive index, of the guide material.

The coil(s) of the stator may be connected to an external switching circuit which allows the device according to the present invention to function as an electric motor, the switching circuit allowing input electrical energy to be applied to the coils to be stored as kinetic energy by the rotor. When the device functions as a generator the switching circuit allows electrical energy to be extracted from the coils. Where impending failure of the rotor is detected, the kinetic energy of the rotor may be rapidly extracted by switching of the device to its generator mode and by connection of the coils of the stator to a high resistance electrical load.

The said tubular body portion of the rotor may comprise a tube which is a right circular cylinder of uniform cross-section although it could also comprise a tube whose cross-sectional area varies along its length or part of its length eg at its end regions only. The said body portion may have a single frusto-conical envelope or back-to-back frusto-conical envelope portions in longitudinal cross-sectional. Alternatively, the said portion may have a longitudinal cross-sectional shape in which the outer diameter is constant but the inner diameter varies either from one end of the body portion to the other or from the ends to the central region of the body portion. Desirably, the gap between the rotor and stator is substantially constant along the length of the said body portion of the rotor even when the cross-sectional area of the latter varies. Desirably, the arrangement of the rotor and stator is such that the magnetic fields generated in use between the two extend substantially orthogonally to the axis of the rotor.

The said means for electromagnetically suspending the rotor may comprise electromagnets which desirably constitute active electromagnetic bearings. The rotor may incorporate ferromagnetic material, eg soft iron, at its peripheral regions facing the said electromagnet to facilitate the production of suitable suspension control forces between the electromagnets and the rotor.

Desirably, the active electromagnetic bearings are transducerless. Such bearings and the servo-control loops to stabilise the suspension produced thereby are described in our copending patent applications EP549,911A and EP549,912A. The device may comprise feedback means from the output circuit to the power inputs of the electromagnetic bearings whereby energy derived from the rotor is employed to power the electromagnets of the bearings.

The rotor and the stator may further include magnet, eg soft iron, portions facing one another which are of similar polarity whereby the portions provide passive magnetic bearings for suspension of the rotor at low speeds.

The form and construction of the rotor in the device according to the present invention is unexpectedly advantageous compared with the prior art. In those prior art designs in which the flywheel is attached to spokes radially extending from a hub, where bearings are located, it is difficult to obtain strain matching of the spokes and this has required complex and expensive solutions. A substantial part of the mass of the flywheel is near to the axis of the flywheel. Use of a tubular rotor allows bearings to be employed at the ends of the rotor rather than at its centre and avoids the use of undesirable spokes. The rotating mass when in the form of a tubular rotor constituting the flywheel can beneficially have its mass concentrated away from the axis. By incorporating magnetic material in the resin matrix of the fiber-reinforced material the electromagnetic interaction between the rotor and stator can be efficiently maintained along the length of the body portion (at least) of the rotor and out of balance regions in the high speed rotating mass can be avoided.

The device according to the present invention may be employed in a vehicle propulsion system. In use, kinetic energy from the motion of the vehicle and/or its suspension system is converted into kinetic energy by the device operating in its motor mode. In an extreme situation where a vehicle brakes hard a power input of typically up to 200 kW may be obtained. In due course, the device may be switched to its generator mode whereby kinetic energy stored by the rotor is extracted as output electrical energy. The electrical energy may be reconverted into mechanical energy in a device connected to a user system, eg a brushless d.c. motor. The output extracted waveform from the generator may be converted in a known way, eg by smoothing, so that it is suitable for acceptance by the said device.

Embodiments of the present invention will now be described by way of example with reference to the accompanying drawings, in which.

Figure 1:
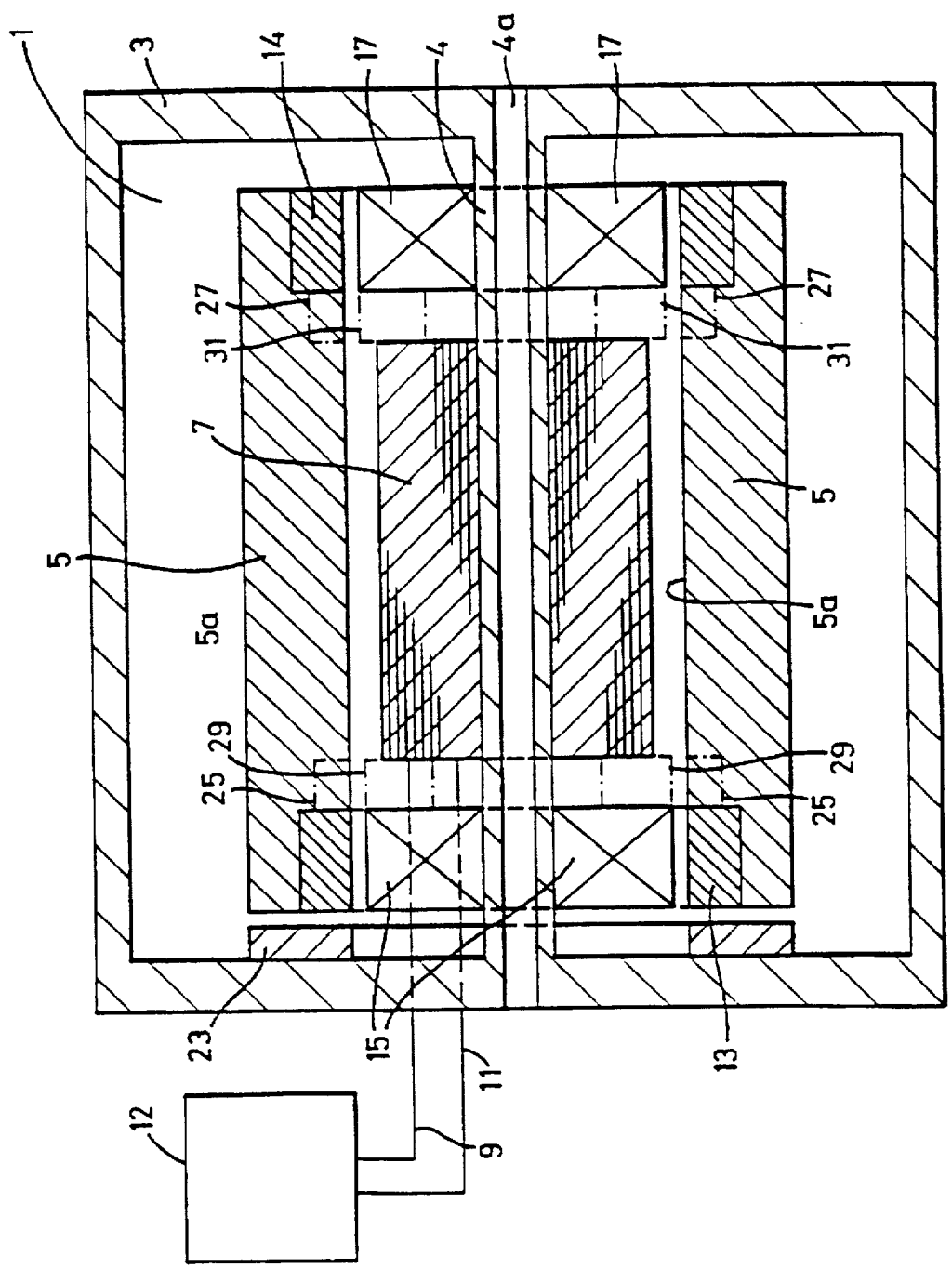
FIG. 1 is a sectional elevation of a rotor flywheel arrangement.

As shown in FIG. 1, a vacuum chamber 1 is enclosed by a drum shaded casing 3. A tubular shaft 4 is fitted between the ends of the casing 3 and extends along the axis of the casing 3. A cylindrical tubular rotor 5 is suspended in the chamber 1 co-axial with the tubular shaft 4. The rotor 5 comprises a fiber reinforced composite material and a magnetic material for example cobalt samarium. A stator 7 is mounted on the shaft 4 between the shaft 4 and the rotor 5. The stator 7 comprises a magnetic core (which may be laminated in a known way) and also one or more electrical coils in contact with the core which coils are connected to conducting leads two of which, leads 9 and 11, have insulating coatings (not shown) are shown fitted through one end of the casing 3 and lead to an external circuit 12.

The rotor 5 incorporates at its ends rings 13, 14 of soft iron whose inner surfaces form part of the inner surface 5a of the rotor 5 facing the stator 7. Electromagnet systems 15, 17 are mounted on the shaft 4 adjacent to the ends of the stator 7 and face the rings 13, 14 respectively. Each electromagnet system comprises a common rectangular cross-sectional magnetic core ring and four active coils mounted equiangularly around the core ring. Each coil is connected to external conducting leads (not shown) which are in turn connected to external circuits (not shown) which energise the coils of the electromagnet systems 15, 17. The external circuits also monitor and detect parameters which provide servo-control of the suspension of the electromagnet systems 15, 17 relative to the iron rings 13, 14 in the manner described in our EP 549,911A and EP 549,912A. The electromagnet systems 15, 17 and the rings 13, 14 thereby provide radial active magnetic bearing suspension of the rotor 5 about the stator 7. An active magnetic bearing system 23 adjacent to the end of the rotor 5 provides a thrust bearing which locates the rotor 5 in its required longitudinal position along the axis of the shaft 4.

Magnetic rings 25, 27 formed on the inner surface of the rotor 5 may be optionally provided facing magnetic rings 29, 31 of similar polarity (as the rings they face) on the outer surface of the stator 7. The rings 25, 27, 29, 31 provide passive magnetic bearings to suspend the rotor 5 at low speeds.

Heat generated within the arrangement shown in FIG. 1 may be removed by passing a coolant, eg water, along the inside 4a of the tubular shaft 4.

In use, the arrangement shown in FIG. 1 may operate in either an electric motor or an electric generator mode. When the arrangement is acting as a motor the circuit 12 is switched whereby electrical energy is provided as an input to the coils of the stator 7 whereby the rotor 5 is caused to rotate. The rotational speed of the rotor 5 may be very high, eg 100,000 to 200,000 revolutions per minute. When the arrangement is acting as a generator the rotation of the rotor 5 causes induction of an electromotive force providing a voltage in the coils of the stator 7 which is extracted as external electrical energy via the circuit 12. The extracted voltage waveform may be converted in a known way, eg by smoothing, to a form which is suitable for use in an external load, eg a brushless dc motor.

Figure 2:
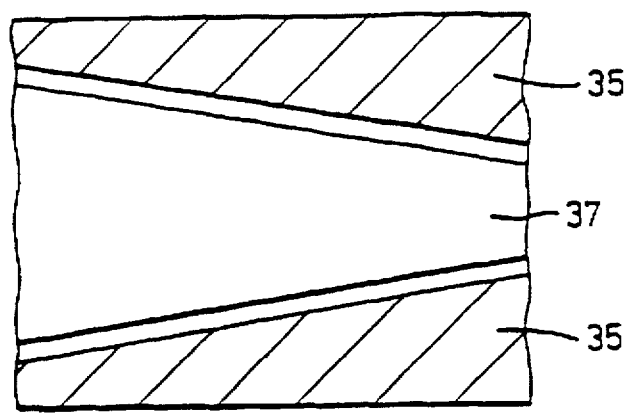
FIG. 2 shows in longitudinal section an alternative form of rotor and stator for use in the arrangement shown in FIG. 1.
Figure 3:
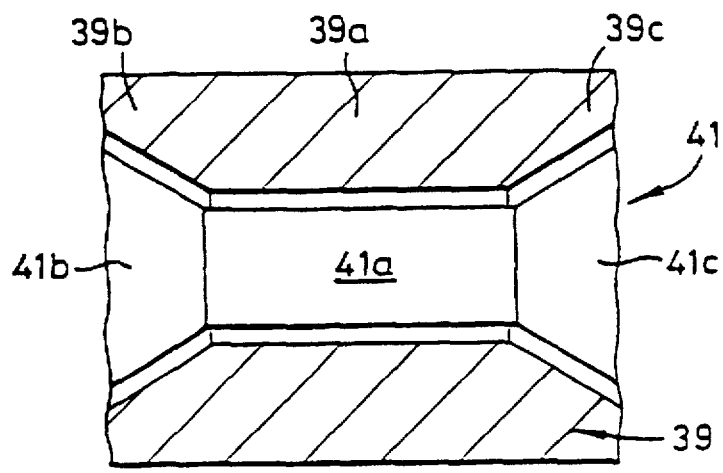
FIG. 3 shows in longitudinal section a further alternative form of the rotor and stator for use in the arrangement shown in FIG. 1.

Alternative geometrical forms for the rotor and stator are shown in FIGS. 2 and 3. In FIG. 2 the rotor 5 and stator 7 of FIG. 1 are replaced by a rotor 35 and stator 37. The other components of the device are not shown. The rotor 35 comprises a tubular cylinder whose transverse cross-sectional area increases along the length of the rotor 35 (from left to right as shown in FIG. 2). The transverse cross-sectional area of the stator 37 shows a corresponding decrease along its length whereby the gap between the rotor 35 and stator 37 is substantially constant along the length of the rotor 35.

In FIG. 3 the rotor 5 and stator 7 of FIG. 1 are replaced by a rotor 39 and stator 41. The other components of the device are not shown. The rotor 39 comprises a tubular cylinder whose transverse cross-sectional area is constant in the central portion 39a of the rotor 39 but which decreases toward the respective ends of the rotor 39 in regions 39b, 39c. The stator 41 correspondingly is of uniform transverse cross-sectional area in the central region 41a adjacent to the region 39a of the rotor 39 but increases toward the respective ends of the stator 41 in regions 41b, 41c adjacent to the regions 39b, 39c of the rotor 39 whereby the gap between the rotor 39 and stator 41 is substantially constant along the length of the rotor 39.

Figure 4:
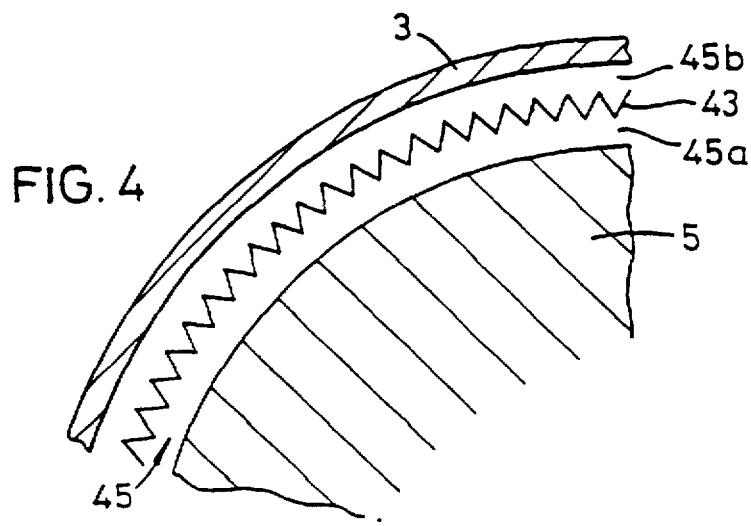
FIG. 4 shows a partial transverse section of the arrangement shown in FIG. 1 including the additional feature of a semi-permeable membrane.

FIG. 4 shows an arrangement whereby residual gas molecules in the chamber 1 (cf. FIG. 1) may be removed to reduce parasitic energy losses. A corrugated microporous membrane 43 is located in a space 45 of annular cross-section between the rotor 5 and the casing 3.

In use gas molecules in a region 45a of the space 45 are flung by the rotor 5 toward the membrane 43 and, by their own momentum, penetrate the membrane 43 to reach a region 45b behind the membrane where they become trapped.

We claim:

1. An energy conversion and storage device which comprises a magnetic rotor and a stator comprising one or more electric coils whereby electrical energy may be applied to and extracted from the device when the rotor is rotating relative to the stator and means for electromagnetically suspending the rotor whilst rotating relative to the stator, wherein the rotor comprises a body portion formed of a composite of fiber reinforced material and the stator is disposed inside the rotor co-axially with the rotor; wherein the body portion of the rotor is a hollow tubular cylinder and has a length along its axis which is greater than its widest diameter; magnetic material is embedded within the fiber reinforced material of the body portion of the rotor; and the stator extends along at least a major part of the length of the said body portion of the rotor.

2. A device as in claim 1 and wherein the length of the body portion faces the stator over at least 90 per cent of the length of the stator.

3. A device as in claim 1 and wherein the stator is formed using a substrate comprising a die cast or sintered or extruded or moulded tube or cylinder, the substrate comprising ironless metallic or polymeric material.

4. A device as in claim 1, and wherein the stator has means associated therewith by which iroi particles suspended in a pumpable fluid may be injected into or removed from a cavity within the stator whereby the permeability of the stator may be varied according to the reauired state of energisation of the device.

5. A device as in claim 1 and wherein the rotor and stator are contained in an enclosure defining a chamber which may be evacuated to a high vacuum state during use to minimise molecular drag upon the rotor and the parasitic energy losses produced thereby.

6. A device as in claim 5 and wherein the chamber includes an arrangement by which residual molecules may be accelerated toward and through a semi-permeable membrane and trapped in a region of the chamber behind the membrane to assist,develop and maintain the vacuum.

7. A device as in claim 6 and wherein the membrane comprises a microporous material which allows gas molecules through at high speed but does not allow back transmission at low speeds.

8. A device as in claim 6 and wherein the semi-permeable membrane is provided in the space between the rotor and the enclosure inner wall whereby the membrane may be penetrated in use by residual gas molecules projected toward the membrane by the rotary action of the rotor and thereafter trapped in the region between the membrane and the enclosure inner wall.

9. A device as in claim 8 and wherein the membrane is corrugated to increase the probability of molecules being projected through the membrane.

10. A device as in claim 5 and wherein the device includes a hollow conduit through which coolant fluid may be passed to remove heat generated during use.

11. A device as in claim 10 and wherein the conduit comprises a hollow shaft located substantially on the axis of the stator and extending between the respective facing end walls of the enclosure.

12. A device as in claim 5 and wherein the inner wall of the enclosure comprises means to arrest the material of the rotor in the event that the rotor crashes into the enclosure following malfunction during use.

13. A device as in claim 1 and wherein in order to detect an impending failure of the rotor in the device, the device includes means for monitoring the temperature in the said chamber or of the rotor and/or for monitoring the stress patterns developed in the body of the rotor.

14. A device as in claim 13 and wherein fiber-optic guides are used to monitor remotely temperatures or stress patterns of the rotor.

15. A device as in claim 1 and wherein the coil or coils of the stator are connected to an external switching circuit which allows the device to function alternatively as an electric generator or an electric motor, the switching circuit allowing input electrical energy to be applied to the coils to be stored as kinetic energy by the rotor.

16. A device as in claim 1 and wherein the said tubular body portion of the rotor comprises a tube whose cross-sectional area varies along its length or part of its length.

17. A device as in claim 1 and wherein the gap between the rotor and stator is substantially constant along the length of the said body portion of the rotor.

18. A device as in claim 1 and wherein the arrangement of the rotor and stator is such that the magnetic fields generated in use between the two extend substantially orthogonally to the axis of the rotor.

* * * * *